United States Patent Office 3,360,681
Patented Dec. 26, 1967

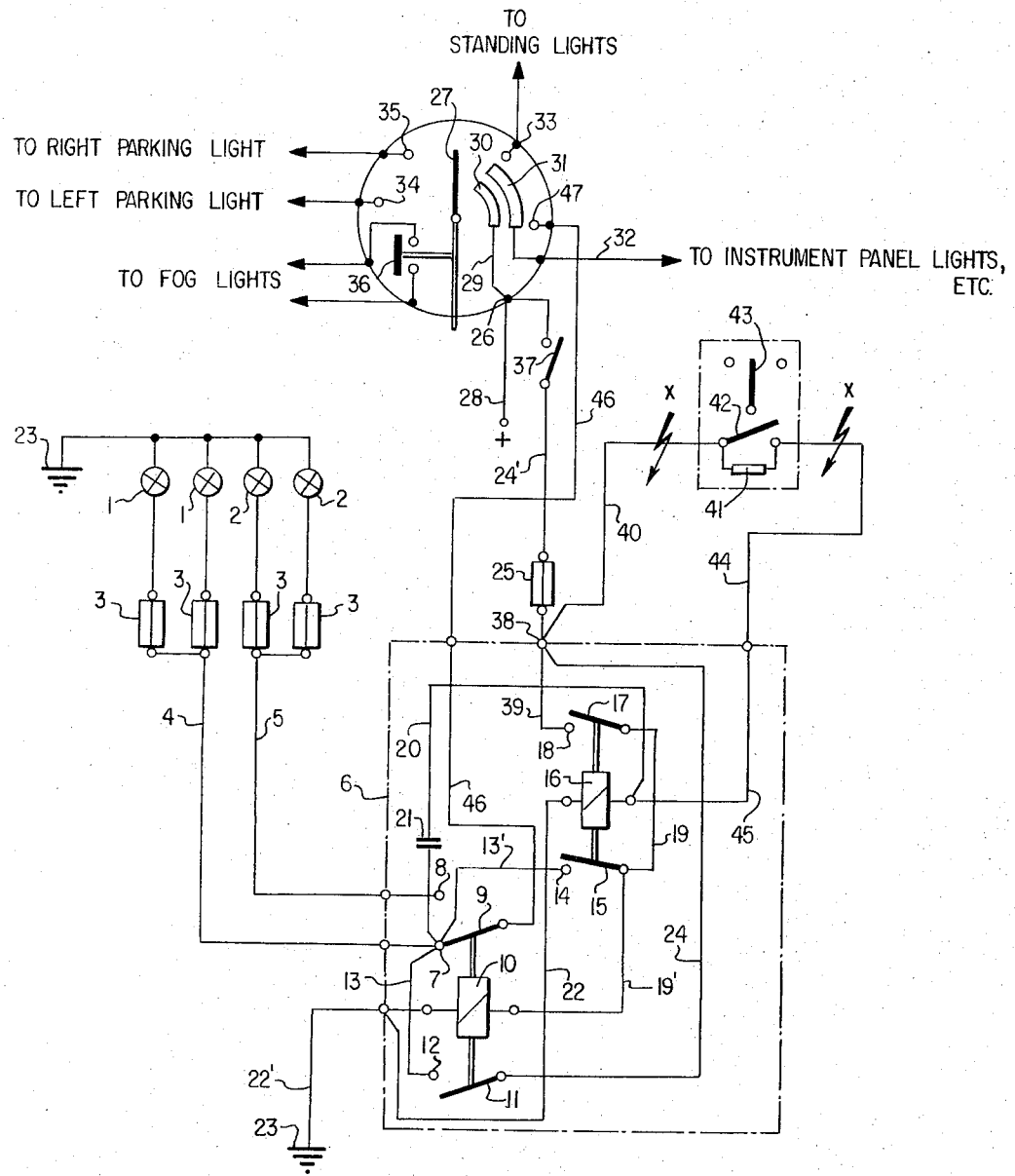

3,360,681
HEADLIGHT-DIMMING SYSTEM INCLUDING AUTOMATIC SWITCHING TO DIMMED BEAM UPON FAILURE IN THE CONTROL CIRCUIT
Werner Köhler, Stuttgart-Degerloch, and Ralf Schacher, Stuttgart-Gaisburg, Germany, assignors to Daimler-Benz Aktiengesellschaft, Stuttgart-Unterturkheim, Germany
Filed Sept. 15, 1965, Ser. No. 487,469
Claims priority, application Germany, Sept. 15, 1964, D 45,418
11 Claims. (Cl. 315—83)

ABSTRACT OF THE DISCLOSURE

A dimmer switching system for the motor vehicle headlights in which one contact of the dimmer relay is adapted to engage either with the circuit for the main headlight or with the circuit for the dimmed headlight, and in which a control relay having two normally open contacts controls the operation of the winding of the dimmer relay by connecting one normally open contact in series in the energizing circuit for the winding of the dimmer relay while the energizing circuit for the control relay includes a parallel resistance and switch network with the resistance being so chosen that the winding of the control relay is energized only to such an extent as to close the other normally open contact, the normally open contact of the control relay in series with the energizing circuit of the dimmer relay being closed only upon full energization of the control relay when the switch short-circuits the resistance of the parallel network. The dimmer relay additionally includes a movable contact adapted to close an energizing circuit from the ignition switch to the full headlight circuit, the latter also being connected with the fixed terminal of the other movable contact of the control relay. Energization of the headlight circuit from the headlight switch takes place by way of the movable contact of the dimmer relay adapted to engage either the full headlight or dimmed headlight circuit. A capacitor is connected also between the full headlight circuit and the energizing winding of the control relay to automatically switch from full beam to dimmed beam under certain conditions.

---

The present invention relates to an improvement and further development of a manually actuated dimmer switching system for motor vehicle headlights with a stepping switch relay system arranged between the light impulse switch and the headlights.

The present invention essentially consists in the operative association of a relay which is operatively connected not only with a line or circuit controlled by the main light switch but also with a line or circuit independent of this main light switch. Additionally, this relay comprises two magnetic windings or coils of which one controls a double-throw switch for the switching from dimmed or low beam lights to full or high beam headlights and vice versa whereas the second coil or winding is connected in series with the light impulse switch connected in parallel with a resistance and is so arranged and interconnected in series with and ahead of the first coil that it is able to control the first coil from full headlight position to dimmer light position and additionally is under the influence of a condenser which during its discharge, in case of failure of the current in the light impulse control circuit, produces a current impulse for the control from the full headlight position to the dimmer light position.

The purpose of the present invention is to assure that in case of occurrence of short-circuit or wire break in the control line of the light impulse switch, the headlights are automatically switched from full headlight to dimmer lights in order to prevent occurrence of a condition wherein the driver is forced to drive on with the full headlights and possibly may become the cause of accidents by reason of the forced-upon blinding lights.

Accordingly, it is an object of the present invention to provide a headlight control system which can be manually actuated yet avoids the aforementioned shortcomings and drawbacks encountered heretofore.

Another object of the present invention resides in the provision of a manually operated headlight dimmer control system which is so constructed and arranged as to automatically switch the headlights to the dimmer light position in case of short-circuit, cable break or failure of the current circuit.

Still another object of the present invention resides in a manually operated headlight dimmer circuit which greatly improves the safety of operation and prevents possible accidents by malfunction of the dimmer control system.

A further object of the present invention resides in the provision of a manually operated headlight dimmer control system which is simple in construction, utilizes a minimum of parts yet is extremely reliable in operation to prevent unintentional or inadvertent operation of the high beams of the headlights.

A still further object of the present invention resides in the provision of an electromagnetically controlled dimmer circuit in combination with a manually operated switch which affords great versatility in the operation of the system.

Another object of the present invention resides in the provision of a manually operated headlight switch for motor vehicles which increases the ease of manipulation thereof notwithstanding the simplicity in design.

These and further objects, features, and advantages of the present invention will become more obvious from the following description when taken in connection with the accompanying drawing which shows in the single figure thereof, one embodiment in accordance with the present invention.

In the drawing, the single figure represents a schematic diagram of the control circuit in accordance with the present invention.

Referring now to the single figure of the drawing, reference numeral 1 designates two lights shown only schematically and forming the full headlight or high beams and reference numeral 2 the two lights of the dimmed headlight or low beams. Of course, the full headlight beams and dimmed beams 1 and 2 may be incorporated, for instance, as separate filaments into the same sealed beams, the showing in the drawing being only schematic and for illustrative purposes. The full light and dimmed beams 1 and 2 are connected by way of the conventional fuses 3 and lines 4 and 5, respectively, to a so-called step control relay system generally designated by reference numeral 6. The line 4 leads to a fixed contact 7 and the line 5 to a fixed contact 8 which are both adapted to be brought into electrical connection with the movable switching contact 9 of a double-throw switch. The double-throw movable contact 9 is under the influence of a magnetic coil or winding 10 constituting a conventional bipolar dimmer relay which additionally influences or controls a movable switching contact 11 that is adapted to engage a fixed contact 12 and thereby establish a connection from terminal 38 by way of line 24, movable contact 11, fixed contact 12, line 13 with terminal 7 or interrupt the same. This relay is constructed with the switching contact 9 operating in a bi-polar manner moving between the contacts 7 and 8 each time coil 10 is energized and remaining at that contact until the coil is energized again; whereas, the switching contact 11 is a conventional single throw relay member which engages the contact 12 only so long as the coil 10 is energized. The fixed contact 12 is thus connected by way of a line 13 with contact 7 and by way of line 13' with a further fixed contact 14. The fixed contact 14 is operatively associated with a movable switching contact 15 which is adapted to engage the fixed contact 14 and is also under the influence of a magnetic coil 16 forming the control relay that additionally influences a second movable switching contact 17. The movable switching contact 17 is adapted to be connected with the fixed counter contact 18. The two switching contacts 15 and 17 are conventional single throw members actuated only as long as coil 16 is energized and are connected with each other by a line 19. Another line 20 including a condenser 21 leads from the coil 16 to the contact 7. Additionally, the coil 16 is connected with ground 23 by way of lines 22 and 22'. Lines 24 and 24' including a fuse 25 leads from movable switching contact 11 by way of terminal 38 of the relay assembly 6 to the terminal 26 of a rotary light switch 27. From terminal 26 a further line 28 leads to one terminal of the battery (only schematically indicated) whose other terminal is connected to ground (not shown). Another line 29 leads from terminal 26 to an arcuate sliding contact 30 of the rotary switch 27. The sliding contact 30 is disposed in parallel to a second sliding contact 31. The usual lights in the vehicle which normally light up with a turning on of the vehicle lights, for example, tail lights, instrument panel lights, and/or the switches for the interior lights of the vehicle, etc., are connected with the sliding contact 31 by way of line 32. Additionally, the rotary switch includes a contact 33 for the standing lights. Two further contacts 34 and 35 are provided for the rotary switch 27 for use with the right and left parking lights. A pull-type switch 36 for turning on and off the fog lights is also combined with the rotary light switch of the present invention. Finally an ignition switch 37 is connected in the line 24'. From the terminal contact 38 of the relay system 6 to which are connected the lines 24 and 24' as well as a branch line 39 leading to the fixed contact 18, leads a further line 40 to a light impulse switch 42 connected in parallel with a resistance 41, which switch 42 is physically combined, as usual, with a turn indicator switch 43. The switch 42 connects the coil 16 by way of lines 44 and 45 with the line 40 and thus with terminal 38. The movable switching contact 9 is further connected by way of a line 46 with a contact 47 of the rotary switch.

*Operation*

The manipulation and operation of the system described above is as follows:

It is assumed that the movable switches and switch contacts assume the positions thereof illustrated in the single figure of the drawing. If one closes the ignition switch 37, then the full voltage is applied from the batery terminal (+) and the line 28 by way of the light switch terminal 26 to the lines 24 and 24' containing the fuse 25 and to the line sections 39 and 40; by reason of the voltage drop across the resistance 41, with an open switch 42, only a partial voltage somewhat lower than the full battery voltage is applied to the lines 44, 45 and 20 which is just sufficient to energize the winding 16 to such an extent that it opens the movable switching contact 15 but as yet does not close the movable switching contact 17 thereof. Hence, with switch 42 open, movable contacts 15 and 17 are open, and so the circuit from contact 38 to line 19 is open with the result that the battery voltage is not applied either to terminal 7 or across coil 10. The voltage drop in resistor 41 occurs due to the current flow which can be traced from the positive terminal of the battery by way of line 28, terminal 26, closed ignition switch 37, line 24', fuse 25, terminal 38, line 40, resistance 41, lines 44 and 45, coil 16, and lines 22 and 22' to ground 23. Thus, the full headlights 1 as well as the dimmed headlights 2 remain deenergized.

During use of a bypas signal light in daylight, which takes place by closing the switch 42, the lines 44, 45 and 20, previously supplied only with partial voltage, now receive the full battery voltage since the resistor 41 is short-circuited by switch 42, thus eliminating the voltage drop. Accordingly, the coil 16 is fully energized and now closes the movable switching contact 17 while movable contact 15 stays open. As a result thereof, the full voltage is also applied across coil 10 from terminal 38 by way of line 39, fixed contact 18, movable contact 17 and lines 19 and 19' with the other side of coil 10 connected to ground 23 by way of line 22'. Energization of the coil 10 thereupon closes the movable switching contact 11 whereby the high beam filaments are supplied with current from terminal 38 by way of line 24, movable switching contact 11, fixed contact 12, line 13, terminal 7 and line 4 and the full beam headlights 1 are thereby lighted so long as switch 42 is actuated. Obviously, daylight signalling can thus be realized in the usual manner by repeatedly actuating switch 42 causing the full headlights to follow the switch movements in the same rhythm.

Nothing changes in the control conditions described above when the standing lights are turned on through pivoting of the rotary switch 27 to engage the contact 33. Such pivotal movement of the rotary switch 27 to engage with the standing light contact 33 has a further consequence that all current-consuming devices that are to be turned on simultaneously with the turning on of the vehicle lights are supplied with current via line 32 from the line 28 and the terminal 26 of the rotary light switch by way of the sliding contacts 30 and 31, which are now electrically bridged by the rotary switch 27.

This supply of current by way of line 32 also takes place when the rotary switch 27 is rotated to engage with fixed contact 47.

In the latter position, i.e., when the rotary switch 27 is rotated to engage the fixed contact 47, the full battery voltage is applied by way of line 46, movable switching contact 9 to fixed contact 7. If the driver while driving at night or with a predetermined traffic condition now desires to engage either the full headlights or the dimmed headlights, then this also takes place by means of the switch 42. By closing the switch 42, the full voltage is again applied across the energizing winding 16 of the control relay by way of the fuse 25 and the lines 40, 42, 44 and 45. As a result of energization of the winding 16 of the control relay, contact 17 again closes and in turn thus applies the full voltage across the energizing winding 10 of the dimmer relay by way of the lines 19 and 19'. Consequently, the contact 9 changes from contact 7 to contact 8 and switches from full headlights to dimmed headlights.

If thereafter the full headlights are again needed, one only needs to actuate again the switch 42 and the operation described above repeats itself, only with the difference that now the contact 9 switches over from contact 8 to contact 7 and the full headlights are again engaged.

If a short circuit occurs in the line 40–44, then the fuse 25 melts and the headlights again are dimmed automatically in the following manner, it being assumed that contact 9 is in engagement at that point with the fixed contact 7 as no dimming operation would be necessary if the contact 9 were already in engagement with the contact terminal 8.

The contact 9 which at first is connected with the fixed contact 7, is in its full headlight position. At the moment of burning of the fuse 25, the line section 40, contact 42, and the lines 44, 45 and 20 are without current with the result that the voltage previously existing at the point of connection of capacitor 20 to line 45 is gone. As a result thereof, the energizing winding 16 of the control relay is completely de-energized and the contact 15 now closes on contact 14 once again. Consequently, current is conducted by way of line 46, movable contact 9, contact 7, line 13′, contact 15 closed on contact 14, line 19′ to coil 10, so that the movable contact 9 is switched from high beam contact 7 to low beam contact 8, and the headlights thus radiate dimmed light only.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. In a vehicle lighting system including high beam lights and low beam lights, a voltage supply for said lights, a bi-polar relay having an energizing winding and a switching member selectively connecting said voltage supply to said high beam lights or said low beam lights alternately upon energization of said winding, and impulse switch means for selectively connecting said voltage supply to said bi-polar relay winding upon manual actuation thereof, wherein the improvement comprises, said impulse switch means including an impulse switch connected with a control relay having an energizing winding connected at one end via said impulse switch to said voltage supply and at the other end to ground controlling a first normally closed switching member connecting said high beam lights to the energizing winding of said bi-polar relay, and impedance means connected between said voltage supply and said one end of said control relay energizing winding for controlling said energizing winding to hold said first switching member open only during normal operation of said impulse switch means.

2. The combination defined in claim 1 further including a fuse connected between said impulse switch and said voltage supply opening the circuit from said voltage supply to said control relay in response to abnormal operation of said impulse switch means.

3. The combination defined in 1 wherein said impulse switch is combined with a blinker-type turn indicator switch.

4. The combination defined in claim 1 wherein said control relay further includes a second normally open switching member connected between said voltage supply and the energizing winding of said bi-polar relay.

5. The combination defined in claim 4 wherein said impedance means comprises a resistance connected across said impulse switch, said resistance being of such value as to limit the current through the energizing winding of said control relay with said impulse switch open to a value below that necessary to operate said second switching member and at least equal to that needed to operate said first switching member to normally disconnect said high beam lights from said energizing winding of said bi-polar relay.

6. The combination defined in claim 1 further including rotary selector switch means for selectively connecting said voltage source to said switching member of said bi-polar relay including pull-type switch means for operating fog lights, contact means for the parking lights, and a terminal contact for the standing lights.

7. The combination defined in claim 4 wherein said bi-polar relay further includes an additional normally open single throw switching member directly connecting said voltage supply to said high beam lights only during energization of said energizing winding of said bi-polar relay, said impulse switch closing only momentarily upon actuation thereof.

8. The combination defined in claim 7 further including an ignition switch connected in series with said additional normally open single throw switching member.

9. In a vehicle lighting system including high beam lights and low beam lights, a voltage supply for said lights, a bi-polar relay having an energizing winding and a switching member selectively connecting said voltage supply to said high beam lights or said low beam lights alternately upon energization of said winding, and impulses switch means for selectively connecting said voltage supply to said bi-polar relay winding upon manual actuation thereof, wherein the improvement comprises, relay means normally connecting said high beam lights to said energizing winding of said bi-polar relay for switching said switching member of said bi-polar relay during energization of said high beam lights in response to disconnection of said impulse switch means from said voltage supply.

resistance means connected to said impulse switch means and to said relay means for limiting the current through said impulse switch means during non-operation thereof to a value capable of only operating said relay means to disconnect said high beam lights from said energizing winding of said bi-polar relay, and a fuse connected between said voltage source and said impulse switch means for disconnecting said voltage source from said impulse switch means in response to an electrical fault therein.

10. The combination defined in claim 9 wherein said impulse switch means includes an impulse switch connected in parallel with said resistance means to said voltage supply and a control relay having an energizing winding connected between ground and said impulse switch and a switching member connected between said voltage supply and the energizing winding of said bi-polar relay.

11. The combination defined in claim 10 wherein said bi-polar relay further includes an additional normally open single throw switching member directly connecting said voltage supply to said high beam lights only during energization of said energization winding of said bi-polar relay, said impulse switch closing only momentarily upon actuation thereof.

References Cited

UNITED STATES PATENTS

| | | | |
|---|---|---|---|
| 2,910,621 | 10/1959 | Paule | 315—82 |
| 3,135,893 | 6/1964 | Fetzer et al. | 315—83 |

FOREIGN PATENTS 915,605  1/1963  Great Britain.

JAMES W. LAWRENCE, *Primary Examiner.*

R. JUDD, *Assistant Examiner.*